Aug. 22, 1961     W. W. MUMFORD     2,997,709

RADAR RECEIVER MONITORING

Filed Feb. 28, 1955

INVENTOR
W. W. MUMFORD
BY
ATTORNEY

United States Patent Office 2,997,709
Patented Aug. 22, 1961

2,997,709
RADAR RECEIVER MONITORING
William W. Mumford, Parsippany-Troy Township, Morris County, N.J., assignor to Bell Telephone Laboratories, Incorporated, New York, N.Y., a corporation of New York
Filed Feb. 28, 1955, Ser. No. 490,758
9 Claims. (Cl. 343—17.1)

This invention relates to pulse echo radars and, more particularly, to improvements therein for increasing the signal-to-noise ratio of the receiver and for maintaining it at a high value.

Since the range limit of a radar depends as much on the minimum detectable signal as the maximum transmittable power, it is desirable to build radar receivers having the highest possible signal-to-noise ratios and thereby the highest usable sensitivities, and to maintain these performance characteristics continuously at peak levels. Since a crystal mixer as the input element of a short wave radar receiver usually exerts a controlling influence on the signal-to-noise ratio thereof, it is obviously desirable to use one having the lowest possible noise figure. However, this has not thus far been possible since all of the lowest noise crystals, e.g., certain silicon crystal diodes which are well known to those skilled in the art, happen to be so susceptible to burn out that they are soon damaged by leakage of transmitter power into the receiver through the duplexing or transmit-receive unit conventionally referred to as a TR box. Where additional crystal protection is provided by a device like a second TR box which is actuated by keying pulses (the leakage pulses normally not being strong enough to do so) the resulting increase in usable receiver sensitivity is so offset by additional input system attenuation that there is no over-all gain at all or so little that the increased complexity and cost of the radar are unwarranted.

Accordingly, one of the objects of this invention is to reduce TR box leakage in pulse echo radars with little or no increase in input system attenuation and by the use of as little additional equipment as possible.

In addition, present radar receiver monitoring methods have been generally unsatisfactory. For example, those in which the radar antenna must be turned toward a signal source, such as a test oscillator or a fixed reflector, to produce indications which should predominate over noise indications in a predetermined way if the receiver is in proper adjustment, all involve disabling the radar during monitoring since it can neither search nor track when its antenna is immobilized. In addition the strength of the signals produced by these sources is subject to a multitude of influences which affect the accuracy of the test. Other methods involving the use of echo boxes produce indications occupying extended portions of the usable range region of the detector screen, thus hindering normal use of the radar if not preventing it altogether. And finally, other methods in which the test signal is fed directly into the receiver and which may be very satisfactory as to the accuracy of the receiver test afforded are even less satisfactory from an operational standpoint since they require actual dismantling of part of the radio frequency transmission system extending between the TR box and the receiver, for example, the removal of one or more sections of wave guide so that special components including a section containing a noise source and one or more matching elements may be connected to the receiver. Obviously this type of monitoring involves completely disabling of the radar for some time before and after the test as well as during it.

Accordingly it is another object to improve the monitoring of radar receivers so that the normal operation thereof is neither interrupted nor hampered whereby monitoring can be carried out as frequently as desired or even continuously while the radar is in use.

In general, both of these objects have been attained by a single expedient and thereby at the least cost for each, namely by installing at least one positive column type of gas discharge tube in the radar radio frequency transmission system between the TR box and the receiver and periodically keying it on in synchronism with the radar for portions of the receiving and transmitting parts each cycle to produce a monitoring indication during the former and to attenuate the TR leakage power during the latter. Thus the discharge tube may be keyed on for an interval which extends over a terminal portion of each radar cycle and thereafter over an initial portion of the next cycle whereby to first provide a standard noise signal late enough in the receiving part of each cycle to cause the monitoring indication to appear on an unused range region of the indicator screen after echoes from the most remote detectable objects have had time to be received. This provides an uncluttered indicator screen space on which all detectable targets may be displayed. Also the tube will serve to provide attenuation for the TR box leakage power during at least the start of the transmitting part of the next cycle. This protects the receiver against the strong leading edge spike of the leakage pulse before the TR box has reached its maximum effectiveness.

If, for a particular radar the interval between transmitted pulses corresponds so closely to its maximum range that there is no unused range region on the indicator screen, the tube may be keyed on twice per cycle: once during transmission for attenuating the TR box leakage; and once at an appropriate time during receiving for producing a noise signal and thereby the monitoring indication. Where this is done the second keying may be appropriately timed and of suitably short duration for the monitoring indication to occupy a narrow strip of the screen area where it can take the place of, and serve a secondary function as, a range marker. Attenuation of echo pulses by the positive column during any significant portion of the receiving part of each radar cycle is avoided by having the tube off most of that time, i.e., by not keying it on until late in each cycle as noted above and thereafter initiating its quenching long enough before the start of the transmitting part of the next cycle so that deionization of its gaseous filling is well advanced and the plasma column well diffused by the time of arrival of echoes from the nearest-in objects. By utilizing a mixture of gases having a deionization time which is not much longer than the duration of a transmitted power pulse, such timely completion of quenching before the start of the receiving part of the next cycle can be accomplished even though its initiation is delayed until very near to the start of its short intervening transmitting part to permit the desired substantial attenuation of the leading edge spike of the leakage pulse. Attenuation of echo pulses by the tube in its quenched condition is avoided by mounting it so that the lossiness of the tube structure itself is negligibly small and the fixtures employed for mounting it do not cause any undesirable resonance or discontinuity effects at frequencies within the operating band of the system. In other words, the tube is so mounted that when it is in its unfired condition its presence in the radio frequency transmission system between the TR box and the receiver does not adversely affect the radio frequency "transparency" thereof. It may be found that a mismatch is incurred between the receiver and the fired tube, i.e., between the receiver and the column of plasma, in mounting it in the manner disclosed herein for preserving the radio frequency transparency of the receiver input system. If so, this can easily be overcome in accordance with another feature of the invention by adding one or more tubes suitably spaced apart and adjusted to draw suitable space currents so that together they constitute a network, e.g., a T or L pad, which has the desired impedance as seen from the receiver.

Since the tube(s) in addition to serving as a noise source also functions as an attenuator which enables a substantial increase in the usable receiver sensitivity the present type of monitoring not only does not hinder normal radar operation but actually helps it.

Figure 1:
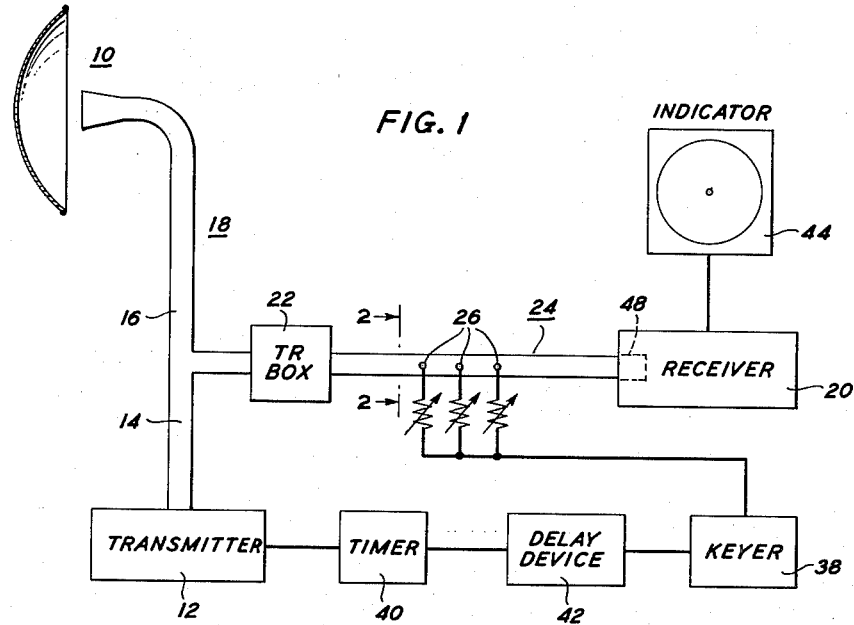
FIG. 1 is a block diagram of a radar system embodying the present invention.

In the radar of FIG. 1 there is a directive antenna 10 which periodically first radiates into space a pulse of high frequency energy provided by a transmitter 12 over a transmitter branch 14 and a common portion 16 of a wave guide system 18, and then during an ensuing receiving interval intercepts reradiations of the pulse returning to it from reflective objects and/or transponders and sends them to a receiver 20 over the common branch 16, a TR box 22 and a receiver branch 24. Three positive column gaseous discharge tubes 26 are mounted in a portion of the branch 24 between the TR box 22 and the receiver 20 with their axes extending perpendicular to both the direction of propagation through the section and the direction of the electric field within it. The discharge currents of the three tubes may be adjusted to vary the impedances which they offer singly when ionized (see Bell System Technical Journal, vol. 38, page 608, 1949) so that the resistive component of their combined output impedance as a T-pad matches the input resistance of the receiver 20 (see Southworth, "Principles and Applications of Wave-Guide Transmission," Chapter 8, pages 236–8 and 257). In addition the distances between successively positioned tubes may be made to differ sufficiently from an exact wave guide quarter wavelength at the radar frequency to tune out against each other any small reactive components comprised in their individual impedances so that the pad as a whole will be substantially purely resistive. This is useful not only in that the transfer of noise power from the source to the receiver will be maximum and thereby more readily predictable but also that it will be uniform over all of the receiver bandwidth. As will be understood from the foregoing by those familiar with the art, the noise source may similarly be matched to the receiver by using other pluralities of the gas tubes, for example, by using two which are spaced apart and adjusted to constitute a matching L rather than T pad.

Figure 2:
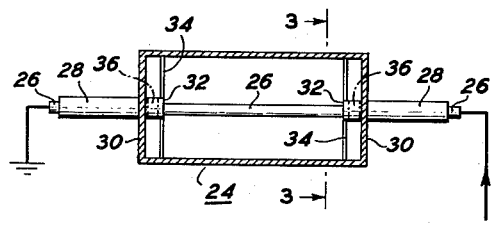
FIG. 2 is a cross section of the receiver input wave guide taken along the line 2—2 of FIG. 1.
Figure 3:
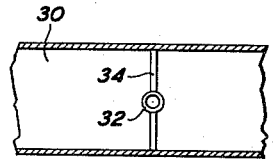
FIG. 3 is a fragmentary cross section of a small part of the same wave guide taken along the line 3—3 of FIG. 2.

Referring now to FIGS 2 and 3, it is noted that each of the tubes is mounted with its opposite ends nested within a pair of cylindrical sockets 28 which pass through respective openings near the centers of opposite narrow sides 30 of the wave guide and are rigidly attached to said sides. While each socket 28 protrudes out of the guide for most of its length it may also extend into it for a relatively short distance to effectively serve at 32 as a central portion of one of two inductive posts 34 used to tune out the capacitive discontinuity produced in the guide by the greater than unity dielectric constant of the tube envelope, each central portion providing two parallel semi-circular current paths around the sides of the tube 26 between the upper and lower portions of each post 34. If preferred, the inwardly protruding ends of the sockets 28 may be replaced for this purpose by simple metal rings of about the same diameter, e.g., by cutting out the section of each socket 28 which lies between the inner surface of the side 30 through which it protrudes and the post 34 adjacent thereto as represented by the dotted lines in FIG. 2. This arrangement is effective over a wide frequency range since the electrical center of each pair of inductive posts and the capacitive discontinuity which it is intended to tune out are located at precisely the same place along the axis of propagation through the guide, as contrasted, for example, to an arrangement in which straight inductive posts are mounted just ahead of or just behind the tube. It has been found that when they are mounted as disclosed herein the presence of the group of tubes 26 in the guide in their quenched condition does not materially adversely affect its radio frequency transparency over its operating bandwidth, since, in addition to the benefits afforded by using the inductive posts, (1) the lossiness of each tube is negligibly small due to the fact that the only part thereof which passes through the guide is glass and all of its metal parts such as terminals and electrodes are mounted well outside of and away from all parts of the propagation space within the guide, and (2) the sockets themselves do not introduce resonance effects like those which are produced when a tube is mounted obliquely through the guide so that the openings required in its side walls are markedly elongated.

Referring again to FIG. 1, the tubes 26 are periodically fired in unison by pulses provided by a keyer 38 whose operation is synchronized with that of the transmitter 12 by trigger pulses which are applied to it from the radar timer 40 over a delay device 42. The pulses are delayed by this device enough after the start of each radar cycle to cause each keying pulse to trigger the tubes on later than the time when an echo would arrive at the antenna 10 from the limit of the radar range but nevertheless significantly before the end of the range sweep of the indicator 44 so that the noise signal display will be produced on an unused range region of its screen. The keyer 38 is adjusted so that each of its output pulses terminates, and therefore deionization is initiated in the tubes 26 at a time which precedes the start of the receiving portion of the next cycle by an interval corresponding to the deionization time of the gaseous filling of the tubes. If this time is not very much greater than the duration of the radar transmitter pulses it will be possible for the attenuation of the decaying plasma columns to still be high enough for the desired protection of the crystal mixer (48) during the occurrence of the leading edge spike of each leakage power pulse even though quenching is initiated enough in advance thereof for the attenuation to be negligible or at least tolerable in the beginning of the receiving portion of the next cycle. Thus for a mixture of eighty-nine percent of neon, one percent of argon, and ten percent of hydrogen, the deionization time is of the order of $10^{-5}$ seconds as compared with transmitter pulses of the order of from $10^{-7}$ to $10^{-6}$ seconds which are about the shortest in practical use. It is to be noted that some attenuation can be tolerated at the start of the receiving portion of each cycle, and indeed may even be advantageous, because of the strength of the reradiations which are returned from nearby objects. As indicated above the tubes can be keyed on more than once in each cycle, e.g., once for attenuating the leakage power and again for producing monitoring indication, say at the usual location of a range marker. During operation of the radar the receiver 20 will respond to the noise output of the tubes 26 (in the case where they are keyed on once per cycle) to produce a monitoring indication along a peripheral portion of the screen of the indicator 44, i.e., a circular band around its entire periphery if it is a plan position indicator as in the present example. If the brightness control is varied over a range in which the receiver noise also produces a visible indication, i.e., "snow," over all of the visible screen area inside of the circular band, and/or it is set at a suitable point in that range, the operator will be continuously apprised of whether the ratio of the unfortunately changeable receiver noise power to the very stable and standard noise power output of the tubes 26 has increased enough to require servicing or replacement of the receiver. In addition, by noting the brightness of the monitoring indication for a predetermined gain setting he may also be apprised of whether the receiver sensitivity is up to standard.

It is to be understood that the tubes 26 can be mounted to pass transversely through the guide parallel to the electric field therewithin instead of crosswise thereto and that the capacitive discontinuity resulting therefrom can still be similarly tuned out by the use of one or more inductive posts which, however, in such a case could and preferably should be entirely straight from end to end. If the wave guide section is rectangular the mounting direction shown in the drawing may be the more advantageous in that a larger portion of each column of plasma is coupled into the receiver input system.

What is claimed is:

1. A radar system comprising a cyclically pulse-modulated transmitter; a receiver; a directive antenna; a signal transmission system interconnecting said antenna with said transmitter and said receiver; said transmission system including a transmit-receive box interposed between said receiver and the portion of said transmission system connecting said transmitter with said antenna; a positive column noise tube having a hollow, elongated, gas filled envelope; means positioned in said transmission system between said transmit-receive box and said receiver for electrically coupling into said transmission system a central portion of the column of gas contained within said envelope without substantially changing the signal transmission characteristics of said transmission system over its operating bandwidth for the quenched condition of the tube; and means for firing the tube in synchronism with the modulations of the transmitter for a large portion of the transmitting part and a small portion of the receiving part of each radar cycle; said last-mentioned portion including a portion of the interval during which signals are freely passed from said antenna to said receiver; whereby said positive column noise tube will furnish a noise signal to said receiver over said last-described portion for checking the signal-to-noise ratio of said receiver without appreciably interfering with the normal operation of said radar system and during said large portion of the transmitting part of the radar cycle will supplement said transmit-receive box to increase the attenuation of energy reaching said receiver from said transmitter.

2. Apparatus as in claim 1 in which said central portion of the column of gas corresponds to a central portion of the positive column which is produced when the tube is fired.

3. Apparatus as in claim 1 in which the portion of said envelope immediately surrounding said central portion of the column of gas is comprised of a radio frequency transparent material having a dielectric constant greater than one; said transmission system comprising a hollow waveguide section with said central portion of the envelope extending through it, said waveguide having an internal transverse dimension in the direction of the electric field within it for the mode in which signals are propagated through it to the receiver which is substantially greater than the corresponding external dimension of said envelope; said envelope extending transversely through said waveguide section with the long axis of said envelope substantially perpendicular to said electric field direction and to the direction of signal propagation through the section; said coupling means including at least one inductive post having two end portions each extending from a point on an opposite interior surface of said waveguide section toward each other in said electric field direction along an axis the center of which bisects a transverse dimension of said envelope measured in said direction of propagation and a central portion which extends around both sides of said envelope to interconnect said end portions.

4. Apparatus as in claim 3 in which said coupling means further includes a pair of tubular metal sockets each having an open end extending directly toward that of the other for a short distance into said waveguide section through opposite sides thereof in a direction parallel to the magnetic field therewithin and an opposite end extending away from the waveguide section in the opposite direction for a substantial distance outside thereof; the ends of said envelope being nested and shielded within and carried by said sockets with said center portion of its envelope extending unshielded between the inner ends of the sockets; the inner end of one of the sockets serving as said central portion of said inductive post.

5. The radar system of claim 1 and additional positive column tubes each having coupling means, intermediate said transmit-receive box and said receiver, for coupling to said transmission system, said plurality of tubes being coupled at intervals of substantially one quarter wavelength of the median frequency of the frequency range being transmitted by said radar system, and means for adjusting the respective discharge currents drawn by said tubes the impedance of said plurality of tubes can be adjusted to match the input impedance of the receiver.

6. Radar apparatus comprising a cyclically pulse-modulated transmitter; a receiver; a directive antenna; a transmission system interconnecting said antenna with said transmitter and said receiver; a transmit-receive box interposed in said transmission system between the portion thereof interconnecting said transmitter to said antenna and the input to said receiver; a plurality of positive column noise tubes each having a hollow, elongated, radio frequency transparent, gas filled envelope; means electrically coupling into said transmission system, intermediate said TR box and said receiver, a central portion of the column of gas contained within each of said envelopes without substantially changing the signal transmission characteristics of said system over its operating bandwidth for the quenched condition of the tubes to feed to said receiver from said gas in its ionized condition noise power extending over all of said bandwidth and having an inherently stable power level of the same order of magnitude as the spurious noise normally produced in the input portion of the receiver and to produce a controllable amount of attenuation in said system by the presence therein of said gas in said ionized condition thereof; said tubes being spaced at intervals of substantially one quarter wavelength of the mid-frequency of said bandwidth along said system, means for adjusting the magnitudes of the discharge currents of said tubes whereby the combined output impedance of said tubes as a noise source can be matched to the input impedance of the receiver; and means for firing the tubes in synchronism with the modulations of the transmitter for a large portion of the transmitting part and a small portion of the receiving part of each radar cycle; said last-mentioned portion including a portion of the interval during which signals are freely passed from said antenna to said receiver; whereby said noise tubes will furnish a noise signal to said receiver during said last-described portion for checking the signal-to-noise ratio of said receiver without appreciably interfering with the normal operation of said radar system and during said large portion of the transmitting part of the radar cycle will supplement said transmit-receive box to increase the attenuation of energy reaching said receiver from said transmitter.

7. Apparatus as in claim 1 which further comprises an indicator having a screen area on which indications of detected objects can be displayed at different distances from a reference according to their respective ranges from the radar and in which said portion of the receiving part of each cycle is timed so that the firing of said tube therein causes a receiver noise figure monitoring indication to appear at a suitable distance from said reference to serve as a range marker.

8. Apparatus as in claim 1 in which said envelope has a central long axis; the portion of said envelope immediately surrounding said central portion of the column of gas is comprised of a radio frequency transparent material having a dielectric constant greater than one; said system comprises a hollow waveguide section with said central portion of the envelope extending through it perpendicularly to the long axis of the section; and said coupling means comprises at least one inductive post having a central long axis and extending between opposite interior surfaces of said section in the direction of the electric field therewithin for the mode in which signals are propagated over it toward the receiver, the central long axes of both said post and said envelope lying in a flat plane which includes either of them and is perpendicular to said long axis of the section.

9. Apparatus as in claim 8 in which the central long axes of said post and said envelope are perpendicular to each other in said plane.

References Cited in the file of this patent

UNITED STATES PATENTS

| | | |
|---|---|---|
| 2,594,732 | Cork | Apr. 29, 1952 |
| 2,706,782 | Mumford | Apr. 19, 1955 |